Patented June 21, 1949

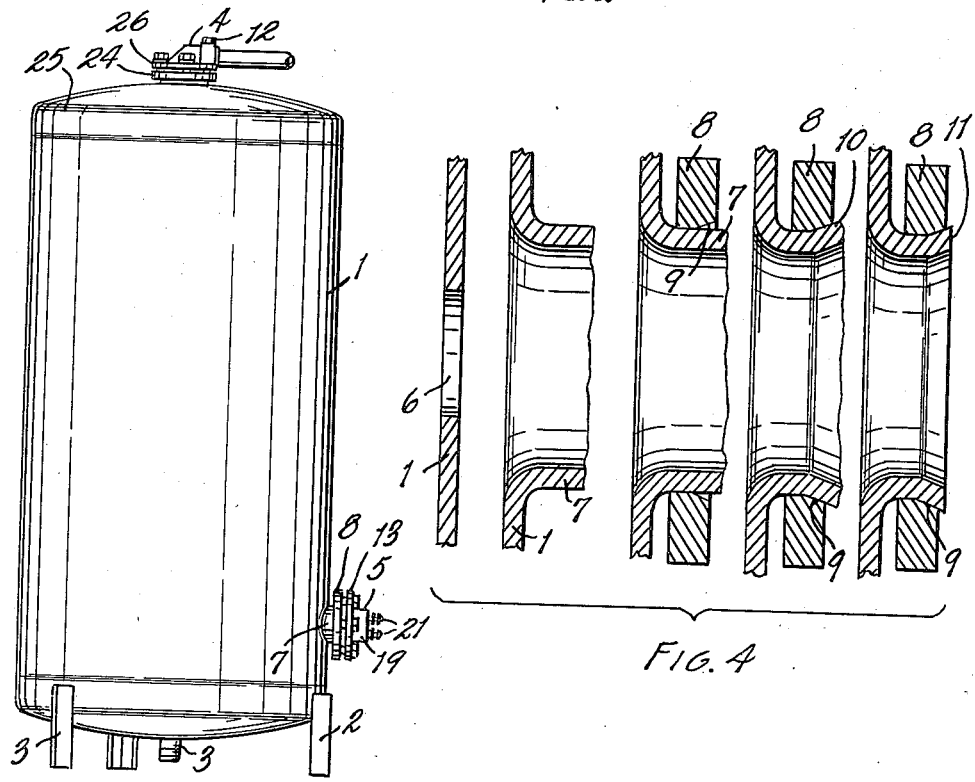
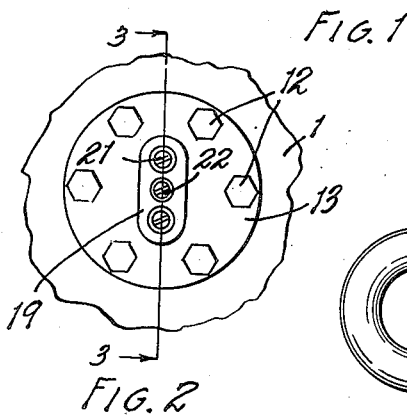
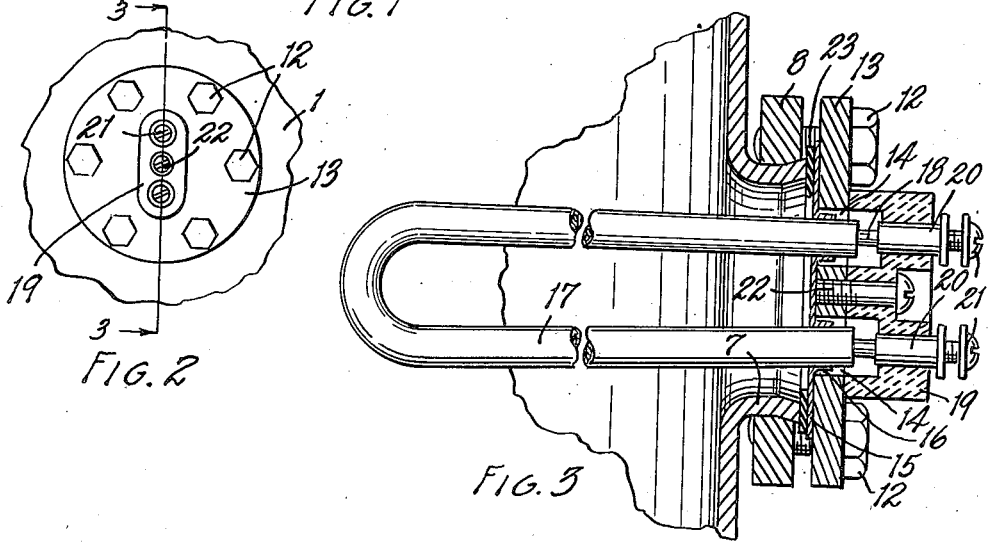
Fig. 1 Fig. 2 Fig. 3 Fig. 4
INVENTOR.
Gerald E. White
BY
Attorney.

2,473,669

UNITED STATES PATENT OFFICE 2,473,669

TANK PORT AND COUPLING

Gerald E. White, Middleville, Mich., assignor to White Products Corporation, Middleville, Mich.

Application November 18, 1946, Serial No. 710,581

8 Claims. (Cl. 219—38)

REISSUED
JAN 22 1952
RE 23457

This invention relates to improvements in a tank port and coupling.

The principal objects of this invention are:

First, to provide a port construction for a water tank or other similar structure which may be formed at relatively low cost.

Second, to provide a port for attaching pipes or heating elements to a tank which will have a single sealable joint with the fixture attached to the tank.

Third, to provide means for easily and securely coupling a fitting on a tank which will form a single sealed junction between the tank and fitting.

Fourth, to provide a method for inexpensively forming a port and coupling portion on a tank adapted to receive a heating element or pipe coupling fixture.

Other objects and advantages pertaining to the economies and details of my invention will be apparent from the following description and claims.

The drawings, of which there is one sheet, illustrate a preferred form of my port and coupling as applied to a hot water heating tank.

Fig. 1 is an elevational view of a water heating tank with a pipe coupling fixture and heating element fixture secured thereto by means of my port and coupling.

Fig. 2 is a fragmentary side elevational view of the heating element fixture shown in Fig. 1.

Fig. 3 is a fragmentary cross sectional view along the line 3—3 in Fig. 2.

Fig. 4 is a composite view in cross section illustrating the steps followed in forming my port.

Fig. 1 illustrates a water tank 1 of sheet metal mounted on three legs 2 and provided with an inlet pipe 3, outlet pipe fixture 4 and heating element fixture 5.

As is most particularly illustrated in Fig. 4 the wall of the tank is pierced as at 6 where it is desired to form the port and coupling for attaching a fixture. This may be either in the side for attaching the heating element fixture or in the top for attaching the outlet pipe fixture or at any other point where it is desirable to connect a fixture communicating with the inside of the tank. Piercing of the wall is preferably done while the wall is in flat form and before it is rolled or shaped into the final tank structure.

After the wall is pierced as at 6 the metal around the aperture is extruded outwardly of the tank to form a drawneck 7 of desired diameter as illustrated in Figs. 3 and 4. An annular ring 8 countersunk on its outer surface as at 9 is then pressed around the drawneck and the outer end of the drawneck is spun radially outwardly as at 10 around the countersunk portion of the ring. The face of the drawneck is then machined or ground flat as at 11 in Fig. 4.

The ring 8 defines a series of tapped holes equally spaced around the perimeter thereof which are designed to receive the ends of cap screws 12 passed through mating holes in the flange 13 of the fixture to be attached to the tank.

As is most particularly illustrated in Fig. 3 the heating element fixture 5 comprises the flange plate 13 which defines a pair of central apertures 14 opening into the drawneck 7. An inner plate 15 defining a pair of outwardly flange apertures 16 is positioned on the inner surface of the flange plate with the flanged apertures 16 positioned in the apertures 14 in the flange plate. A U-shaped heating element 17 has its ends supported in the flanged apertures 16 and securely sealed thereto as by silver solder and supports conductors 18 which extend outwardly through the apertures 14. An insulating member 19 is secured over the apertures 14 and defines a pair of apertures through which the ends of the conductors 18 extend to the terminals 20 which are provided with screws 21 for attaching electric wires to the heating element. A screw 22 countersunk in the outer surface of the insulator secures the insulator and terminals to the flange plate 13.

The heating element fixture is easily attached to the coupling by placing a gasket 23 against the machined edge 11 of the drawneck and drawing the inner surface of the inner plate 15 and flange plate 13 tightly against the outside of the gasket with the cap screws 12. A tightly sealed joint is thus formed between the end of the drawneck and the fixture with a homogeneous wall of metal extending from the seal to the body of the tank.

The spinning operation which expands the end of the drawneck outwardly into the countersunk portion of the ring is believed to develop sufficient heat to anneal or draw any bending strains which might develop in the drawneck because the coupling including the ring and drawneck forms an attaching collar capable of withstanding all of the stress required to tightly clamp the fixture against the end of the drawneck.

The coupling fixture 4 for the outlet pipe may be formed in the same manner just described to provide a coupling ring 24 and drawneck in the top 25 of the tank to which the flange 26 or the outlet fixture may be secured. Obviously other connections could be made to the tank or a similar structure in the same manner. The extruding and spinning operations for forming the drawneck and attaching the coupling ring are easily and quickly performed rendering the formation of the port and coupling and therefore the final cost of the tank relatively inexpensive.

While the drawneck is preferably expanded outwardly into the ring by spinning, it may be expanded by other means—for example, by swaging. However, I find that the expanding by spinning has many advantages, both from the practical standpoint and superior structure.

I have described a highly practical form of my coupling in two applications thereof so that others may reproduce the same for like or similar purposes without further description.

Having thus described my invention, what I claim as new and desire to secure by Letters Patent, is:

1. A port and coupling for a tank having a sheet metal wall comprising a drawneck extruded outwardly from the wall of said tank, and a coupling ring defining a beveled aperture pressed around said drawneck and spaced from the wall of said tank with the beveled portion thereof facing outwardly, the outer end of said drawneck being spun outwardly to lap against said beveled portion, the end surface of said drawneck being machined flat in a plane parallel to said coupling ring and spaced therefrom, said ring defining a series of tapped apertures therearound.

2. A port and coupling for a tank having a metal wall comprising a drawneck extruded outwardly from the wall of said tank, and a coupling ring defining a countersunk aperture pressed around said drawneck and spaced from the wall of said tank with the countersunk portion thereof facing outwardly, the outer end of said drawneck being spun outwardly to lap against said countersunk portion, the end surface of said drawneck being machined flat in a plane parallel to said coupling ring, said ring defining a series of tapped apertures therearound.

3. A port and coupling for a tank comprising a drawneck extruded outwardly from the wall of said tank, and a coupling ring defining a countersunk aperture pressed around said drawneck with the countersunk portion thereof facing outwardly, the outer end of said drawneck being spun outwardly to lap against said countersunk portion, the end surface of said drawneck being machined flat and spaced from said ring.

4. A water tank comprising sheet metal walls, portions of said walls being pierced and extruded outwardly to form drawnecks, coupling rings having outwardly opening countersunk apertures formed therein pressed around said drawnecks and spaced from the walls of said tank, the ends of said drawnecks being spun outwardly into said countersunk portions and machined flat parallel to said coupling rings, said coupling rings defining a series of tapped apertures spaced therearound, a heating element having a flat flange plate secured to one of said coupling collars by cap screws extending therethrough, a gasket clamped between said flange plate and the finished end of said drawneck, a pipe coupling fixture having an annular flange secured to the other of said coupling collars by cap screws extending therethrough, and a gasket clamped between said other drawneck and said annular flange.

5. A water tank comprising a sheet metal wall, a portion of said wall being pierced and extruded outwardly to form a drawneck, a coupling ring pressed around said drawneck and spaced from the wall of said tank, the end of said drawneck being expanded outwardly to overlap a portion of said ring and machined flat parallel to said coupling ring, said coupling ring defining a series of tapped apertures spaced therearound, a heating element having a flat flange plate secured to said coupling collar by cap screws extending therethrough, and a gasket clamped between said flange plate and the finished end of said drawneck.

6. A water tank comprising a sheet metal wall, a portion of said wall being pierced and extruded outwardly to form a drawneck, a coupling ring having an outwardly opening countersunk aperture formed therein pressed around said drawneck and spaced from the wall of said tank, the end of said drawneck being expanded outwardly into said countersunk portion and machined flat parallel to said coupling ring, said coupling ring defining a series of tapped apertures spaced therearound, and a heating element having a flat flange plate secured to said coupling collar by cap screws extending therethrough.

7. A water tank comprising a sheet metal wall, a portion of said wall being pierced and extruded outwardly to form a drawneck, a coupling ring having an outwardly opening countersunk aperture formed therein pressed around said drawneck and spaced from the wall of said tank, the end of said drawneck being expanded outwardly into said countersunk portion and machined flat, said coupling ring defining a series of tapped apertures spaced therearound, a pipe coupling fixture having an annular flange secured to said coupling collar by cap screws extending therethrough, and a gasket clamped between said drawneck and said annular flange.

8. A water tank comprising a sheet metal wall, a portion of said wall being pierced and extruded outwardly to form a drawneck, a coupling ring having an outwardly opening countersunk aperture formed therein pressed around said drawneck, the end of said drawneck being expanded outwardly into said countersunk portion and machined flat in spaced relationship with said ring, said coupling ring defining a series of tapped apertures spaced therearound, and a pipe coupling fixture having an annular flange secured to said coupling collar by cap screws extending therethrough.

GERALD E. WHITE.

REFERENCES CITED

The following references are of record in the file of this patent:

UNITED STATES PATENTS

| Number | Name | Date |
| --- | --- | --- |
| 1,792,928 | Reigart | Feb. 17, 1931 |
| 2,005,087 | Kamack | June 18, 1935 |
| 2,274,445 | Greer | Feb. 24, 1942 |